United States Patent
Lemberger et al.

(10) Patent No.: US 7,730,855 B2
(45) Date of Patent: Jun. 8, 2010

(54) COOLANT CONTROLLER AND METHOD FOR ITS MANUFACTURE

(75) Inventors: Heinz Lemberger, Unterföhring (DE); Barbu Frunzetti, Kornwestheim (DE); Wolfgang Richter, Kornwestheim (DE)

(73) Assignees: Behr Thermot-tronik GmbH, Kornwestheim (DE); Bayerische Motoren Werke Aktiengesellscahaft, Munich (DE)

( * ) Notice: Subject to any disclaimer, the term of this patent is extended or adjusted under 35 U.S.C. 154(b) by 0 days.

(21) Appl. No.: 12/043,382

(22) Filed: Mar. 6, 2008

(65) Prior Publication Data
US 2008/0216776 A1 Sep. 11, 2008

(30) Foreign Application Priority Data
Mar. 9, 2007 (DE) .................. 10 2007 011 673

(51) Int. Cl.
*F01P 7/16* (2006.01)
(52) U.S. Cl. .............. 123/41.08; 236/34.5; 29/831; 29/857; 123/41.1; 123/142.5 E; 73/114.68
(58) Field of Classification Search .......... 123/41.1; 236/34.5, 91 F, 101 C; 264/271.1, 272.11; 73/114.68; 29/848, 831, 857; 251/129.01–129.22
See application file for complete search history.

(56) References Cited

U.S. PATENT DOCUMENTS 5,482,010 A 1/1996 Lemberger et al.
5,676,308 A * 10/1997 Saur ..................... 236/34.5
6,505,580 B2 * 1/2003 Chamot et al. ............. 123/41.1
6,644,619 B2 * 11/2003 Friesenhahn et al. .......... 251/11
2002/0070367 A1 6/2002 Friesenhuhn et al.

FOREIGN PATENT DOCUMENTS

| DE | 37 05 232 A1 | 9/1988 |
|----|--------------|--------|
| DE | 44 09 547 A1 | 1/1995 |
| DE | 197 00 722 A1 | 7/1998 |
| DE | 298 15 583 U1 | 2/1999 |
| DE | 2004062908 A1 * | 6/2006 |
| DE | 10 2004 062 908 A1 | 7/2006 |
| EP | 0 838 580 A1 | 4/1998 |

* cited by examiner

*Primary Examiner*—Michael Cuff
*Assistant Examiner*—Hung Q Nguyen
(74) *Attorney, Agent, or Firm*—Gudrun E. Huckett

(57) ABSTRACT

A coolant controller for a coolant circuit of an internal combustion engine has a housing and a thermostat valve arranged therein. The thermostat valve has at least one valve closing member loadable by a working element as a function of a temperature value, a temperature sensor as well as a heating element for the working element. The housing is provided with at least one plug from which connecting lines extend to the temperature sensor. A current supply for the heating element is present. The plug, the temperature sensor, the connecting lines and the current supply for the heating element are provided as a pre-manufactured assembly and this assembly is integrated into the housing.

14 Claims, 4 Drawing Sheets

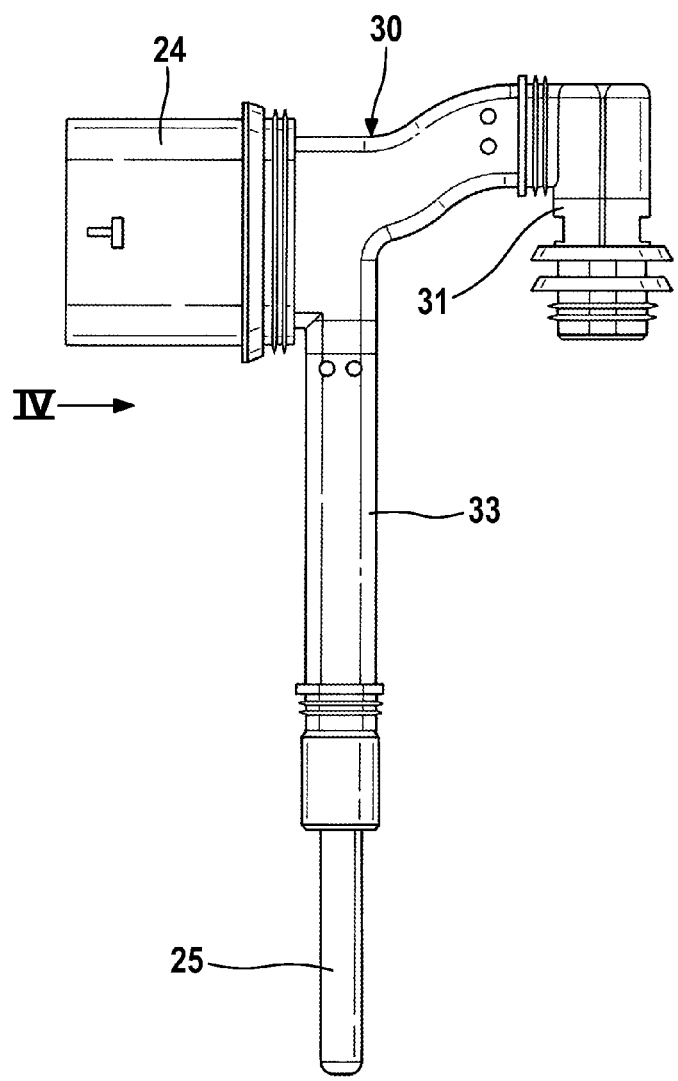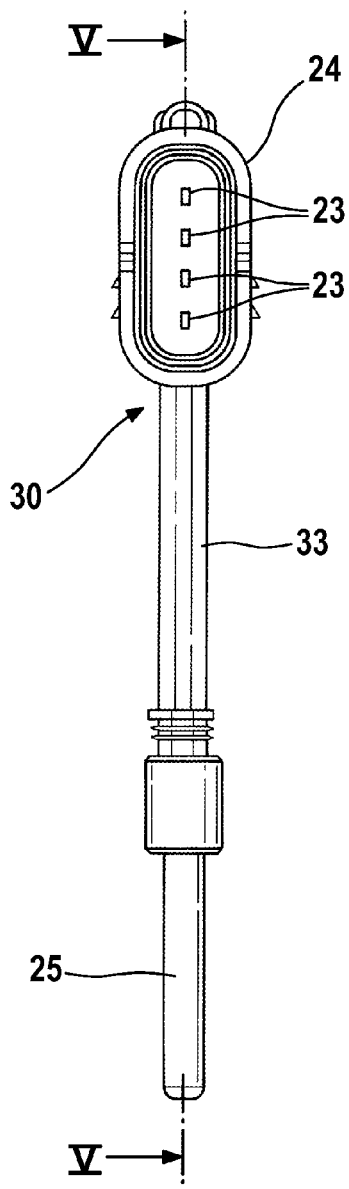
Fig. 3
Fig. 4

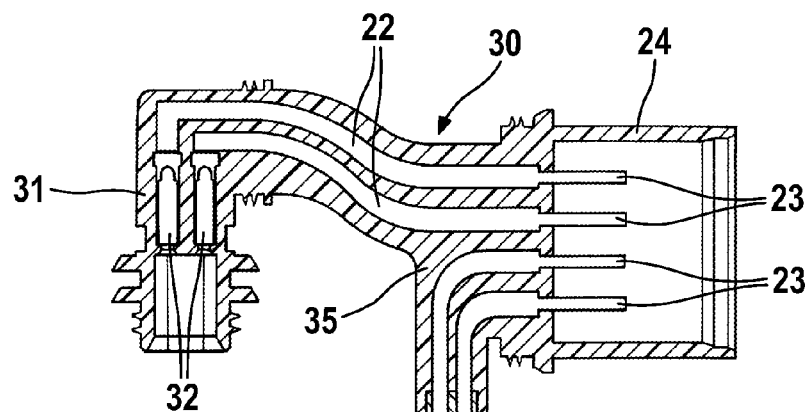
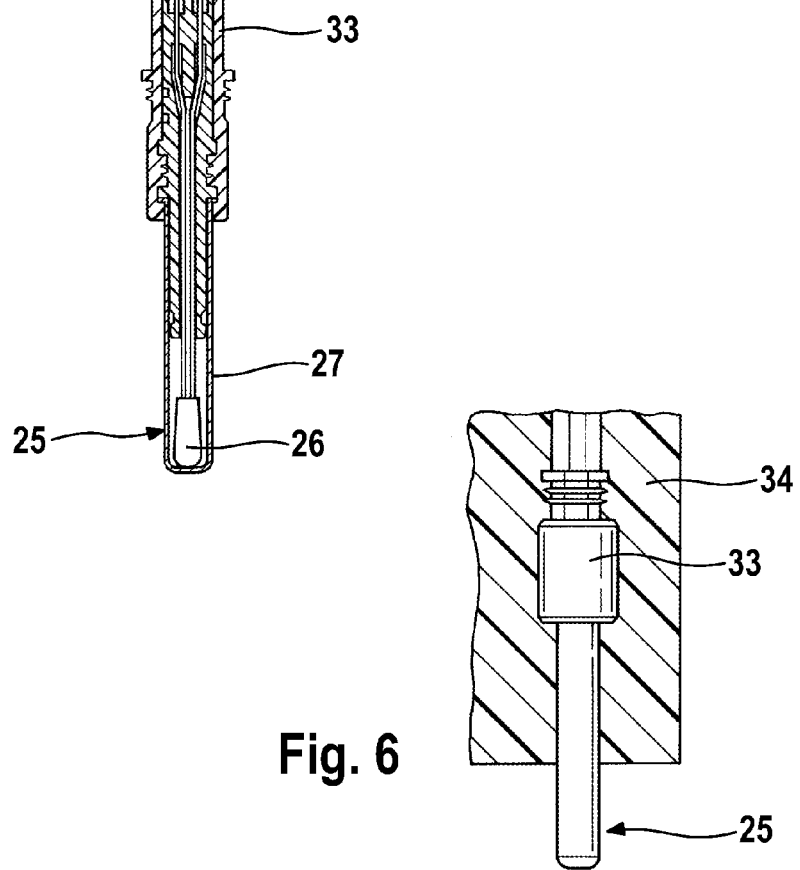
Fig. 5
Fig. 6

COOLANT CONTROLLER AND METHOD FOR ITS MANUFACTURE

BACKGROUND OF THE INVENTION

The invention relates to a coolant controller, in particular for a coolant circuit of an internal combustion engine. The coolant controller comprises: a thermostat valve arranged in a housing that comprises at least one valve closing member loadable by a working element as a function of a temperature value; a temperature sensor; as well as a heating element for the working element.

The invention further relates to a method for manufacturing such a coolant controller.

Cooling devices for an internal combustion engine, for example, in a motor vehicle, comprise in general a coolant controller with a thermostat valve that comprises a working element that operates as a function of the temperature of the coolant liquid. Such a cooling device with thermostat valve is disclosed in U.S. Pat. No. 5,482,010. In this connection, a working element is an expansion element that is provided with an additional heating device. Such coolant controller with thermostat valve controls flow of the coolant between the internal combustion engine and the radiator in such a way that during a warm-up phase the coolant coming from the internal combustion engine is essentially returned to the internal combustion engine without passing through the radiator by means of a bypass opening or a bypass line.

From a certain temperature level on during an operational phase, the coolant coming from the internal combustion engine is partially passed through the radiator and partially passed through the bypass opening in a mixed operation wherein the latter coolant portion is supplied to the internal combustion engine. Above a further preset temperature level, the entire coolant flow is passed through the radiator in order to provide satisfactory cooling of the internal combustion engine. For controlling the internal combustion engine and also for improving the coolant control, temperature sensors are utilized that are provided for detecting a parameter of a medium, preferably the temperature of the coolant. The sensors are provided with a cable that serves for transmission of the acquired data or the respective measured values to a processing unit such as a control device or an on-board computer.

SUMMARY OF THE INVENTION

The present invention has the object to provide a coolant controller of the aforementioned kind that is safe with regard to its function and is simple with regard to its manufacture.

This object is solved in regard to the coolant controller in that on the housing at least one plug is provided from which connecting lines extend to the temperature sensor and in that a current supply for the heating element is present, wherein the plug, the temperature sensor, the connecting lines, and the current supply for the heating element are configured as a pre-manufactured assembly and this assembly is integrated into the housing.

The object is solved in regard to the manufacturing method in that the plug with the connecting lines and the temperature sensor as well as the current supply for the heating element are combined to an assembly, in that this assembly is inserted into an injection mold for the housing of the thermostat valve, and in that the housing is then manufactured by injection of a plastic material into the injection mold.

According to the invention it is provided that on the housing at least one plug is provided from which connecting lines extend to the temperature sensor and that a current supply for the heating element is provided. In this connection, the plug, the temperature sensor, the connecting lines therebetween, and the current supply for the heating element are configured as a pre-made assembly and this assembly is integrated into the housing. Before being integrated into the housing, the assembly can be tested with regard to its function so that quality assurance is simplified. Since at the time of mounting of the coolant controller or at the time of connecting it to a coolant circuit all electrical connectors and the temperature sensor are already integrated, the installation is simple According to a preferred embodiment of the coolant controller, the temperature sensor comprises a sensor pill and a metal pipe wherein the sensor pill is arranged at the end of the metal pipe so as to be heat-conducting. Because of the metal pipe, the temperature of the coolant is transmitted well onto the sensor pill so that very quickly the actual value of the coolant temperature is acquired by the sensor pill and an appropriate signal is transmitted. Preferably, the temperature sensor is secured in or on a housing wall and projects from it into the coolant passage where the coolant flow surrounds it.

According to an alternative configuration, the assembly also comprises the heating element that is connected to the current supply. In this way, a subsequent mounting of the heating element and connecting to the current supply are not required. It is however also possible that at one end of the current supply an additional plug is arranged that is also a component of the assembly, wherein this additional plug is provided for contacting the heating element to be inserted later. The connecting lines and the current supply of the assembly can be comprised of flexible wires but it is also possible to utilize rigid wires, bus bars, or flexible strips. Inasmuch as a sufficient flexibility of the conductors is provided, the parts forming the assembly can still be moved relative to one another upon insertion into the injection mold for producing the plastic housing so that they can be matched in any case to the mold. In order to facilitate insertion into the injection mold for producing the housing, it is expedient that the assembly is configured as a shape-stable component of plastic material and the plug(s) is/are integral part(s) of the component.

According to a further embodiment the connecting lines and the current supply are connected to separate contacts within the plug. In order to reduce outside of the coolant controller the number of connecting lines, it is expedient to utilize these lines for the current supply of the working element as well as for transmitting the sensor signals. In this case, the connecting lines and the current supply are connected to common contacts in the plug.

BRIEF DESCRIPTION OF THE DRAWINGS

Embodiments of the coolant controller according to the invention will be explained in more detail in the following based on the drawing.

FIG. 3 shows an assembly embodied as a shape-stable component with plug and temperature sensor.

FIG. 4 is a view in the direction of arrow IV in FIG. 3.

FIG. 5 is a section taken along the section line V-V in FIG. 4.

FIG. 6 shows an illustration of a temperature sensor secured in the housing of the coolant controller and projecting from the housing.

DESCRIPTION OF PREFERRED EMBODIMENTS

Figure 1:
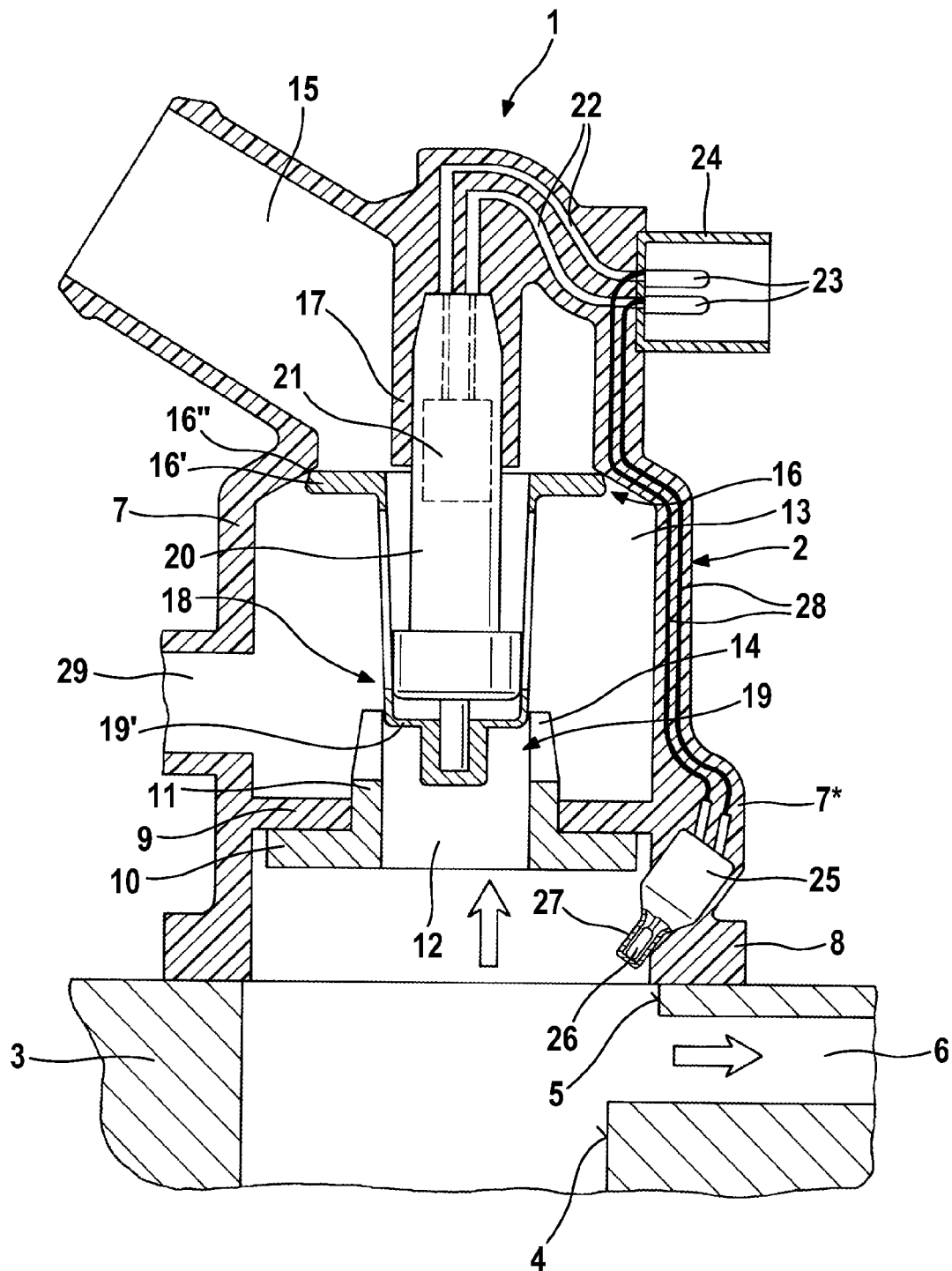
FIG. 1 shows a longitudinal section of a first embodiment of a coolant controller.

In FIG. 1, a coolant controller 1 is illustrated which comprises a thermostat valve 2 that, for example, is attached directly on a motor housing 3. In this way, a bypass line exterior to the internal combustion engine is not required. In the motor housing 3 a coolant passage 4 is arranged and provided with a connecting opening 5 with which the coolant passage 4 is accessible from the exterior of the motor housing 3. In the area of this connecting opening 5 there is a coolant bore 6 to which a feed line of the coolant circuit is connected.

The thermostat valve 2 comprises a housing 7 that is provided at its lower end with a flange 8. This flange 8 rests against the exterior side of the motor housing 3 and covers thus the connecting opening 5. Above the flange 8 a radial inwardly projecting collar 9 is arranged in the housing 7 and a flange 10 with axial sleeve section 11 is attached to it; the sleeve section is concentric to the longitudinal axis of the housing 7. In this sleeve section 11 there is a central bypass opening 12 that opens into a valve chamber 13 provided in the housing 7. On its end projecting into the valve chamber 13 the sleeve section 11 is provided with radial openings 14.

In the upper area of the housing 7 a return connector 15 is provided that is connectable by means of a main valve 16 to the valve chamber 13. A socket 17 projects concentrically to the longitudinal axis of the housing 7 in the direction toward the valve chamber 13 wherein on the socket 17 a thermostat insert 18 is attached that comprises the main valve 16 as well as a bypass valve 19.

In the thermostat insert 18 there is also a working element 20 that is preferably an expansion element. This working element 20 is received in the socket 17 and projects into the valve chamber 13 so that the coolant passing through surrounds the working element. In the area of the lower end of the socket 17 there is the main valve 16 that is comprised of a main valve plate 16' as a valve closing member and a main valve seat 16". The main valve plate 16' is located at the upper end of the thermostat insert 18 and closes off the return connector 15 by contacting the main valve seat 16" according to the illustration in FIG. 1.

For forming the bypass valve 19 on the thermostat insert 18 a valve dosing member 19' is provided that has a diameter that is matched with regard to its cross-section to the bypass opening 12. It is thus possible that with a corresponding movement the valve closing member 19' moves into the bypass opening 12 and in this way closes the passage between the coolant passage 4 and the valve chamber 13. A piston provided on the end face of the working element 20 is inserted into a blind bore of the thermostat insert 18. In this way, the valve closing member 19' and the main valve plate 16' follow the axial movement of the working element 20.

In the working element 20 there is a heating element 21 that is connected by a current supply 22 to contacts 23 that are arranged in a plug 24. In one wall 7* of the housing 7 near the flange 8 there is a temperature sensor 25 whose leading end projects from the wall 7* and projects into the area between the coolant passage 4 and the bypass opening 12 through which the coolant flows. In this way it is ensured that the temperature sensor 25, independent of the position of the thermostat valve 2, is always loaded by the coolant flow and detects the actual temperature. The temperature sensor 25 is comprised of a sensor pill 26 arranged in a metal pipe 27, in particular at the leading end of the metal pipe. The sensor pill 26 and the metal pipe 27 are connected to one another so as to provide excellent heat conduction. The temperature sensor 25 is connected by means of connecting lines 28 to the contacts 23 of the plug 24. The connecting lines 28 are embedded, as is the current supply 22, in the plastic material of the housing 7. The temperature sensors for such applications are in general metallic resistors or semiconductor elements with temperature-dependent resistance such as platinum elements, PTC (positive temperature coefficient) elements or NTC (negative temperature coefficient) elements.

In the state illustrated in FIG. 1 in which the return connector 15 is closed off by the main valve plate 16', the coolant flows exclusively through the bypass opening 12 into the valve chamber 13 and from there through a motor supply connector 29 to which is connected a coolant pump not illustrated in the drawing. As the coolant is heated, the medium in the working element 20 expands and moves the thermostat insert 18 downwardly so that the main valve plate 16' is lifted off the main valve seat 16". In this intermediate position of the thermostat valve 2, the main valve 16 as well as the bypass valve 19 are partially open.

When the valve closing member 19' of the bypass valve 19 has moved so far into the bypass opening 12 that it closes off the radial openings 14 and thus also the bypass opening 12, the coolant flows exclusively through the coolant bore 6 to the radiator and from there back through the return connector 15 and the open main valve 16. Since in this position of the thermostat insert 18 the temperature sensor 25 is still located within the coolant flow, in any position of the thermostat insert 18 the coolant exit temperature of the internal combustion engine is measured quickly and precisely.

Figure 2:
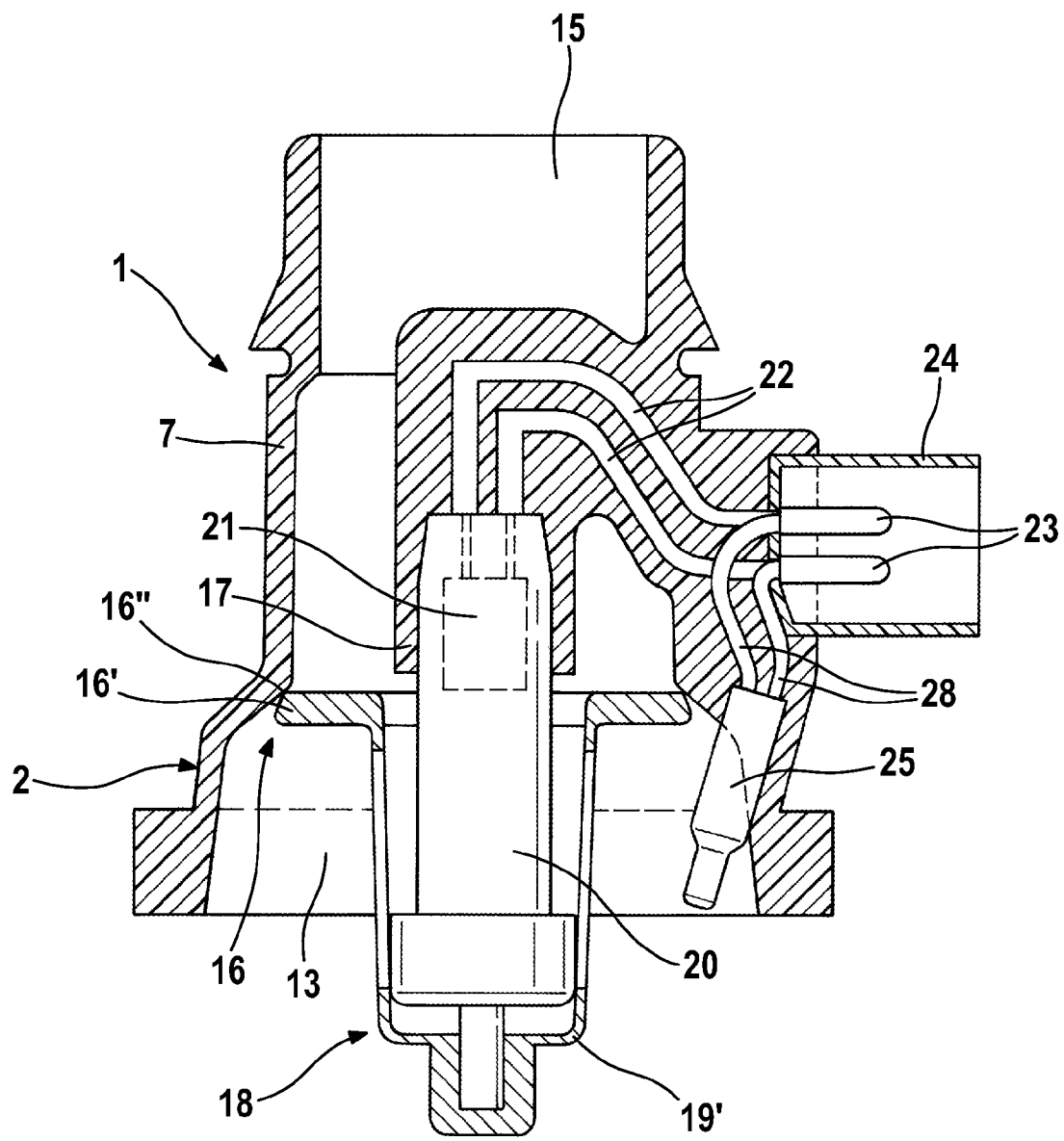
FIG. 2 shows an embodiment variant of FIG. 1.

FIG. 2 shows an embodiment of the thermostat valve 2 with modified return connector 15 and a different position of the temperature sensor 25, i.e., positioned in the vicinity of the main valve 16. However, the housing is of a different design, i.e., of a two-part design wherein only the upper housing part is illustrated. In other respects, the reference numerals are the same for same parts as in FIG. 1 so that reference is being had to the description of FIG. 1.

In the embodiments of FIGS. 1 and 2, the plug 24, the temperature sensor 25, the working element 20, the current supply 22 and the connecting lines 28 are combined to an assembly. The assembly is complete as regards electrical connectors and can therefore be tested with regard to proper function before being installed in the housing 7. For manufacturing the housing 7 the assembly is inserted into the injection mold of the housing and after closing the mold the plastic material is injected. The plastic material in this way surrounds in the area of the socket 17 the working element 20, in the area of the wall 7* the temperature sensor 25 and embeds the current supply 22 and the connecting lines 28 in the housing 7. The plug 24 is also fixedly connected to the housing 7.

In FIG. 3, an assembly is illustrated as a shape-stable component 30. The assembly comprises the plug 24, the temperature sensor 25 as well as a further plug 31 and the connecting lines, not visible in this view, and the current supply. The temperature sensor 25 is secured in a rod-shaped part 33 of plastic member 35 that is embodied as a monolithic part with the plugs 24 and 31. The temperature sensor 25 projects by a certain length from the rod-shaped part 33.

FIG. 4 shows a view in the direction of arrow IV in FIG. 3; it is shown that in the plug 24 four contacts 23 are arranged above one another. The component 30 is very flat and is suitable therefore as an insertion part for producing the housing 7 in FIG. 1 from plastic material.

FIG. 5 shows a section along the line V-V in FIG. 4. It is apparent that the temperature sensor 25 is comprised of a metal pipe 27 and a sensor pill 26 arranged therein wherein the sensor pill 26 rests against the leading end face of the metal pipe and the other end of the metal pipe 27 is secured in the rod-shaped part 33. The four contacts 23 are arranged in the plug 24 wherein each conductor of the current supply 22 and each connecting line 28 are connected to a separate contact 23. In the additional plug 31 two contacts 32 are provided in order to receive corresponding contacts of the heatable working element.

In FIG. 6 a section of the rod-shaped part 33 with the temperature sensor 25 is shown, namely in a form integrated in the housing 34, wherein the housing 34 is also a housing of a thermostat valve that is comprised of plastic material. The plastic material of the housing 34 surrounds the rod-shaped part 33 and also the metal pipe 27 of the temperature sensor 25. With its leading end, in which the sensor pill 26 shown in FIG. 5 is located, the metal pipe 27 and thus also the temperature sensor 25 project from the housing 34.

The specification incorporates by reference the entire disclosure of German priority document 10 2007 011 673.1 having a filing date of Mar. 9, 2007.

While specific embodiments of the invention have been shown and described in detail to illustrate the inventive principles, it will be understood that the invention may be embodied otherwise without departing from such principles.

What is claimed is:

1. A coolant controller for a coolant circuit of an internal combustion engine, the coolant controller comprising:
   a housing;
   a thermostat valve arranged in the housing, wherein the thermostat valve comprises at least one valve closing member loadable by a working element as a function of a temperature value; a temperature sensor; and a heating element for the working element;
   at least one plug provided on the housing;
   connecting lines extending from the at least one plug to the temperature sensor;
   a current supply for the heating element;
   wherein the at least one plug, the temperature sensor, the connecting lines, and the current supply for the heating element are configured as a pre-manufactured assembly, wherein the assembly is integrated into the housing.

2. The coolant controller according to claim 1, wherein the temperature sensor comprises a sensor pill and a metal pipe wherein the sensor pill is arranged in the metal pipe in a heat-conducting way.

3. The coolant controller according to claim 2, wherein the sensor pill is arranged at an end of the metal pipe.

4. The coolant controller according to claim 1, wherein the temperature sensor is secured in a housing wall of the housing and projects from the housing wall into a coolant passage provided in the housing.

5. The coolant controller according to claim 1, wherein the assembly comprises also the heating element connected to the current supply.

6. The coolant controller according to claim 1, wherein at one end of the current supply an additional plug is arranged and the additional plug is also a component of the assembly.

7. The coolant controller according to claim 1, wherein the connecting lines and the current supply are comprised of flexible wires.

8. The coolant controller according to claim 1, wherein the connecting lines and the current supply are comprised of rigid wires, bus bars, or flexible strips.

9. The coolant controller according to claim 1, wherein the assembly is a shape-stable component of plastic material and the at least one plug is an integral part of the shape-stable component.

10. The coolant controller according to claim 1, wherein the connecting lines and the current supply are connected to separate contacts of the at least one plug.

11. The coolant controller according to claim 1, wherein the connecting lines and the current supply are connected to common contacts of the at least one plug.

12. A coolant controller for a coolant circuit of an internal combustion engine, the coolant controller comprising:
    a housing;
    a thermostat valve arranged in the housing, wherein the thermostat valve comprises at least one valve closing member; a temperature sensor; and a heating element;
    a working element acted on by the heating element and loading the at least one valve closing member as a function of a temperature value;
    at least one plug provided on the housing;
    connecting lines extending from the at least one plug to the temperature sensor;
    a current supply for the heating element;
    wherein the at least one plug, the temperature sensor, the working element, the connecting lines, and the current supply for the heating element are configured as a pre-manufactured assembly that is complete with electrical connectors, wherein the assembly is integrated into the housing.

13. The coolant controller according to claim 12, wherein the assembly comprises also the heating element connected to the current supply.

14. The coolant controller according to claim 12, wherein at one end of the current supply an additional plug is arranged and the additional plug is also a component of the assembly.

* * * * *